(No Model.)

C. STARZ.
NUT LOCK.

No. 491,908. Patented Feb. 14, 1893.

WITNESSES

INVENTOR
Cornelius Starz
by W. Bakewell & Sons
his Attorneys

UNITED STATES PATENT OFFICE.

CORNELIUS STARZ, OF PITTSBURG, PENNSYLVANIA, ASSIGNOR OF ONE-HALF TO ALBERT STARZ, OF SAME PLACE.

NUT-LOCK.

SPECIFICATION forming part of Letters Patent No. 491,903, dated February 14, 1893.

Application filed June 29, 1892. Serial No. 438,360. (No model.)

*To all whom it may concern:*

Be it known that I, CORNELIUS STARZ, of Pittsburg, in the county of Allegheny and State of Pennsylvania, have invented a new and useful Improvement in Nut-Locks, of which the following is a full, clear, and exact description, reference being had to the accompanying drawings, forming part of this specification, in which—

Figure 1:
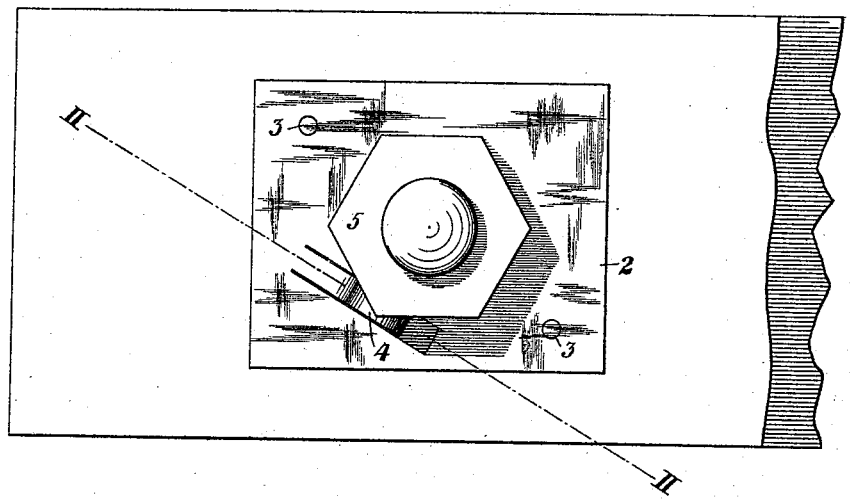
Figure 2:
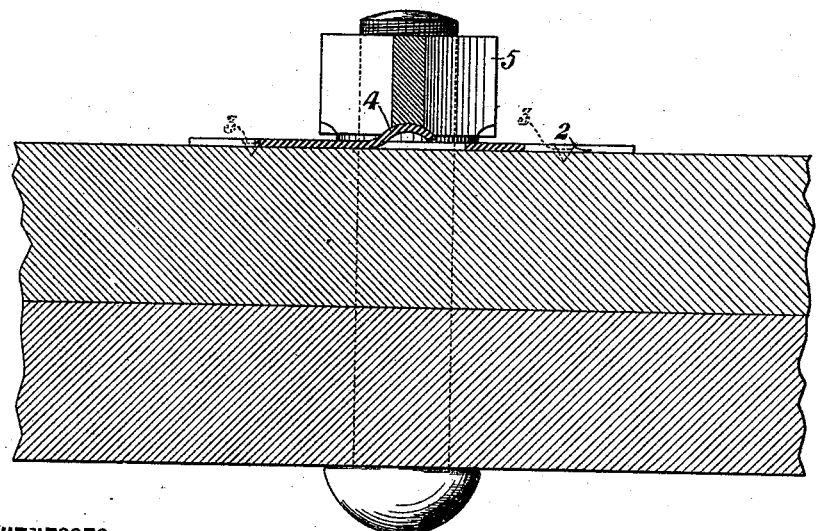

Figure 1 is a top plan view of my improved nut lock as applied to a wooden structure; and Fig. 2 is a cross-sectional view on the line II—II of Fig. 1.

My invention relates to that class of nut locking devices wherein a spring engages the base of the nut and prevents the loosening thereof, and it consists in a plate having a spring cut therefrom and bent upwardly into a curved form, in combination with a nut having a series of recesses in its base with which the curved leaf spring engages with sufficient force to prevent the turning of the nut by the rattling or shaking to which the bolt is exposed.

In the drawings, 2 indicates a rectangular plate having depressed portions 3 struck downwardly therefrom, so as to hold the plate firmly in position by their entering the wooden piece through which the bolt passes. A curved spring 4 of the contour illustrated in Fig. 2, is cut from this plate and bent upwardly, its central portion having the convex form shown. The nut 5 is provided at its corners on the base thereof with a series of curved recesses with which the curved portion of the spring successively engages as the nut is turned to place. The spring is of sufficient strength to prevent the turning of the nut by the rattling of ordinary use, but is not so powerful as to prevent the nut being turned by the ordinary devices used therefor. The cuts for the spring-strip may diverge toward the base if desired, to give more strength to the spring.

The method of using the device is obvious. The perforated plate 2 is slipped over the bolt and the nut forcibly screwed home, the spring successively engaging the recesses in the nut until the desired point is reached, when the spring is left in one of the recesses.

The advantages of the device result from its easy application and removal, while it effectually prevents any turning of the nut.

The device is simple, strong and easy of manufacture and may be applied to iron or other structures or to railroad rails by a slight change in the plate, which changes I regard as coming within the scope of my invention.

I claim:—

1. A nut lock comprising a plate having a strip cut from the body thereof and bent into an outwardly convex curved spring, said spring being supported at one end, and a nut having a recess at each corner of its base; substantially as and for the purposes described.

2. A nut lock comprising a plate, having an outwardly convex spring struck up from the body thereof, depressed portions struck downwardly from the body of the plate to hold the same in place, and a nut having a series of recesses which the spring is arranged to enter; substantially as described.

In testimony whereof I have hereunto set my hand this 23d day of June, A. D. 1892.

CORNELIUS STARZ.

Witnesses:
W. B. CORWIN,
C. BYRNES.